United States Patent [19]

Murase

[11] Patent Number: 4,736,635
[45] Date of Patent: Apr. 12, 1988

[54] ELECTROMAGNETIC FLOWMETER

[75] Inventor: Nobuyasu Murase, Nagoya, Japan

[73] Assignee: Aichi Tokei Denki Co., Ltd., Aichi, Japan

[21] Appl. No.: 13,087

[22] Filed: Feb. 10, 1987

[30] Foreign Application Priority Data

Feb. 14, 1986 [JP] Japan .................. 61-31570

[51] Int. Cl.$^4$ .............................. G01F 1/58
[52] U.S. Cl. ............................... 73/861.15
[58] Field of Search ................ 73/861.12, 861.15

[56] References Cited

U.S. PATENT DOCUMENTS 3,490,282 1/1970 Wada .................. 73/861.15

FOREIGN PATENT DOCUMENTS 0087418 5/1983 Japan ................. 73/861.15

Primary Examiner—Charles A. Ruehl
Attorney, Agent, or Firm—Pollock, Vande Sande & Priddy

[57] ABSTRACT

An electromagnetic flowmeter includes a cylindrical flow path, an even number of magnetic poles disposed on the periphery of the cylindrical flow path by equally dividing the circumference thereof, a plurality of cores having one ends respectively being in contact with the even number of magnetic poles and extending outwardly radially with respect to the cylindrical flow path, a plurality of coils respectively wound about the cores for exciting the cores so that respective adjacent cores exhibit opposite polarities to each other, an outer yoke having a ring shape for connecting the other ends of the cores to form a magnetic circuit, and a plurality of electrodes disposed respectively at intermediate points of respective adjacent magnetic poles and having one ends being in contact with a fluid in the cylindrical fluid path, wherein the even number of magnetic poles are corresponding in number to the cores, to the coils, and to the electrodes, and the number is equal to four or larger.

11 Claims, 4 Drawing Sheets

ELECTROMAGNETIC FLOWMETER

BACKGROUND OF THE INVENTION

The present invention relates to an electromagnetic flowmeter, and in particular, to an electromagnetic flowmeter in which is efficiency of a magnetic circuit is improved thereby to enable to reduce power consumption.

In a prior art electromagnetic flowmeter, as shown in FIG. 1, two coils $C_1$, $C_2$ are provided opposing to each other on the periphery of a pipe P having an insulated inner surface, and an alternating magnetic field B is applied to a fluid F in a diametric direction of the pipe P as shown by the arrow, and a signal voltage e proportional to the product of an intensity of the magnetic field B and a flow velocity of the fluid F is detected by electrodes $E_1$, $E_2$.

In this flowmeter, the pipe P which constitutes a circular flow path (having a circular cross section) serves as a gap of the magnetic circuit, and thus, since the magnetic reluctance is large, there is a problem in that a large exciting power is required. Furthermore, since the distribution of weight function within the pipe is not uniform, another problem is involved in that an instrumentation error is caused when the flow of the fluid F becomes irregular due to an elbow and a valve.

In order to eliminate the instrumentation error due to the irregular flow, a particularly designed electromagnetic flowmeter is known from Japanese Patent Laid-Open (Kokai) Publication No. 58-87418 (1983) in which as shown in FIG. 2, in addition to a pair of coils $C_{a1}$, $C_{a2}$, another pair of coils $C_{b1}$, $C_{b2}$ orthogonal to the pair of coils $C_{a1}$, $C_{a2}$ are provided, and a signal voltage ea produced by an alternating magnetic field Ba applied by the pair of coils $C_{a1}$, $C_{a2}$ is detected by electrodes $E_{a1}$, $E_{a2}$, and a signal voltage eb produced by an alternating magnetic field Bb applied by the pair of coils $C_{b1}C_{b2}$ is detected by electrodes $E_{b1}$, hd Eb2. In this electromagnetic flowmeter, the pair of electrodes $E_{a1}$, $E_{a2}$ and the pair of electrodes $E_{b1}$, $E_{b2}$ are disposed by shifting 90° from each other, and since the distribution of weight functions of both pairs is arranged to complement each other, even when the irregular flow occurs, if a plus error is caused in one of the two pairs of electrodes, a minus error will be caused in the other of the two pairs of electrodes. Accordingly, a true flow rate of the fluid can be calculated by considering a difference between the signal voltages of both the pairs of electrodes. However, the problem of the requirement of the large exciting power still remains.

A proposal for obtaining an electromagnetic flowmeter of small power consumption by improving the efficiency of a magnetic circuit and reducing the exciting power is described in Japanese patent Laid-Open (Kokai) Publication No. 57-200822. In this electromagnetic flowmeter, as shown in FIG. 3, when a current flows through a coil C wound about a core K made of a soft or semi-hard magnetic material, a magnetic field is produced so that the magnetic flux generated in a core K departs from an inner yoke $Y_{i1}$ and passes through a fluid F as magnetic flux $B_1$, and again passes through the fluid F as magnetic flux $B_2$ from an outer yoke Yo, and returns to the core K through an inner yoke $Y_{i2}$. A signal voltage e1 is generated by the $B_1$ and a signal voltage e2 is generated by the magnetic flux $B_2$, and these signal voltages e1, e2 are detected by electrodes $E_1$, $E_2$.

In this electromagnetic flowmeter, small power consumption can be achieved because of a small magnetic reluctance of a magnetic gap constituting the fluid path. On the other hand, since a part of the magnetic circuit is formed within the pipe P, there are problems in that it becomes an obstruction to the flow of the fluid, it increases a pressure loss, and it hinders passage of solid materials.

SUMMARY OF THE INVENTION

An object of the present invention is to solve the aforementioned problems in the prior art and to provide an electromagnetic flowmeter in which the power consumption is small and the pressure loss is also small.

In the present invention, in order to solve the aforementioned problems, the electromagnetic flowmeter includes a cylindrical flow path, an even number of magnetic poles disposed on the periphery of the cylindrical flow path respectively on portions formed by equally dividing the circumference thereof, adjacent ones of the even number of magnetic poles being of opposite polarities to each other, and electrodes respectively positioned at intermediate points of adjacent magnetic poles, an end of each of the electrodes being in contact with a fluid, wherein the magnetic poles are corresponding in number to the electrodes, and the number is equal to four or larger.

In the electromagnetic flowmeter, magnetic lines of force crossing the flow path produces a magnetic field including a magnetic gap between mutually adjacent magnetic poles. A signal voltage generated in proportion to a flow velocity of the fluid and an intensity of magnetic density is induced between adjacent electrodes and is detected by the adjacent electrodes. A length of the magnetic gap is the distance between mutually adjacent magnetic poles, and since the length of the magnetic gap is relatively small as compared with the diameter of the flow path having the circular cross section, a large magnetic flux density can be produced in the flow path with small exciting power.

BRIEF DESCRIPTION OF THE DRAWINGS

FIGS. 4-6 are respectively schematic sectional invention, views illustrated embodiments of the present invention in which FIG. 4 is the sectional view at right angles to the pipe in an embodiment including four magnetic poles; FIG. 5 is the sectional view at right angles to the pipe in another embodiment including eight magnetic poles; and FIG. 6 is the sectional view at right angles to the pipe of another embodiment.

FIGS. 7 and 8 relates to still another embodiment, in which FIG. 7 is a sectional view at right angles to the pipe; and FIG. 8 is a side view.

FIGS. 9 and 10 relates to still another embodiment, in which FIG. 9 is a sectional view at right angles to the pipe showing a structure of electrodes; and FIG. 10 is a side view of the structure of the electrodes.

DESCRIPTION OF THE PREFERRED EMBODIMENTS

Figure 4:
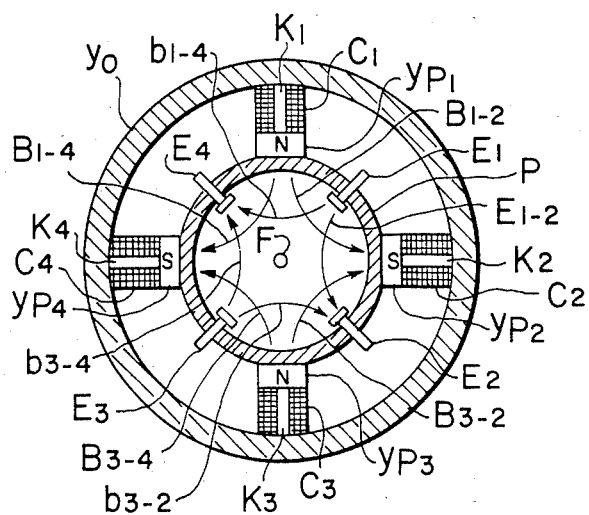

FIG. 4 shows an embodiment in which the number of magnetic poles is four. In FIG. 4, the letter P designates a pipe for forming a cylindrical fluid path, and the inner surface of the pipe P is electrically insulated. Letters $Y_{p1}$-$Y_{p4}$ designate magnetic poles disposed on the periphery of the pipe P by equally dividing the circumference of the pipe P, and cores $K_1$-$K_4$ having one ends respectively being in contact with the magnetic poles $Y_{p1}$-$Y_{p4}$ and having the other ends extending radially outwardly with respect to the fluid path, and coils $C_1$-$C_4$ respectively wound about the cores $K_1$-$K_4$ for exciting adjacent cores in opposite polarities are provided. Letters $E_1$-$E_4$ designate electrodes respectively disposed at intermediate points of adjacent magnetic poles $Y_{p1}$-$Y_{p4}$, and one ends of the electrodes $E_1$-$E_4$ are in contact with a fluid F. The cores $K_1$-$K_4$ are made of a semi-hard or soft magnetic material. Letter Yo designates a ring-shaped outer yoke to connect the other ends of the cores $K_1$-$K_4$ to form a magnetic circuit. In order to excite the adjacent cores in opposite polarities, the coils of the adjacent cores may be wound in the same direction and exciting currents are supplied to flow in opposite directions, alternatively, the coils of the adjacent cores may be wound in opposite directions and the exciting currents are supplied to flow in the same direction.

Supposing that the coils $C_1$-$C_4$ are excited so that the magnetic poles $Y_{p1}$ and $Y_{p3}$ become N poles and the magnetic poles $Y_{p2}$ and $Y_{p4}$ become S poles, magnetic lines of force departing from the magnetic pole $Y_{p1}$ split into two portions and flow respectively to the magnetic poles $Y_{p2}$ and $Y_{p4}$ and represented by magnetic fluxes $B_{1-2}$ and $B_{1-4}$ which cross the fluid F.

Similarly, magnetic lines of force from the magnetic pole $Y_{p3}$ are represented by magnetic fluxes $B_{3-2}$ and $B_{3-4}$.

Signal voltages $e_{1-2}$, $e_{1-4}$, $e_{3-1}$ and $e_{3-4}$ are generated respectively in proportion to a flow velocity of the fluid F and intensities of magnetic fluxes $B_{1-2}$, $B_{1-4}$, $B_{3-1}$, and $B_{3-4}$, and these signal voltages $e_{1-2}$, $e_{1-4}$, $e_{3-1}$, and $e_{3-4}$ are respectively detected by the electrodes $E_1$-$E_4$.

Figure 1:
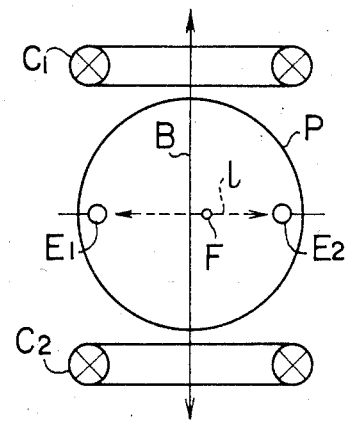
FIGS. 1-3 are respectively diagrams for explaining the principles of prior art electromagnetic flowmeters.
Figure 2:
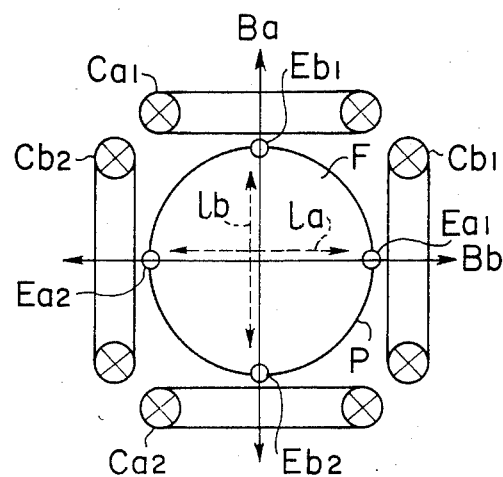
Figure 3:
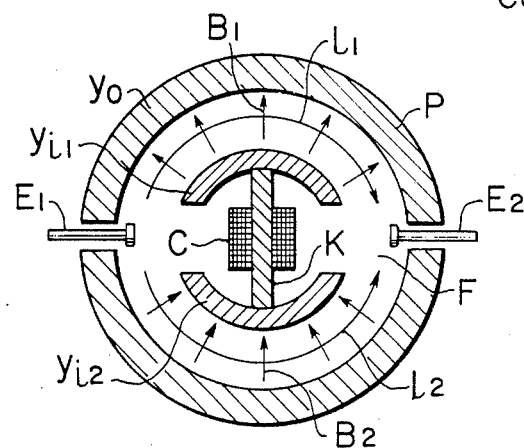

Since the length of a magnetic gap in the fluid path corresponds to a distance between magnetic poles adjacent to each other, in the embodiment of FIG. 4, the length of the magnetic gap is equal to $1/\sqrt{2}$ of the diameter of the pipe P. As a result, the magnetic reluctance in the gap is improved to $1/\sqrt{2}$ as compared with the prior art techniques of FIGS. 1 and 2. Thus the efficiency of the magnetic circuit is increased.

Figure 5:
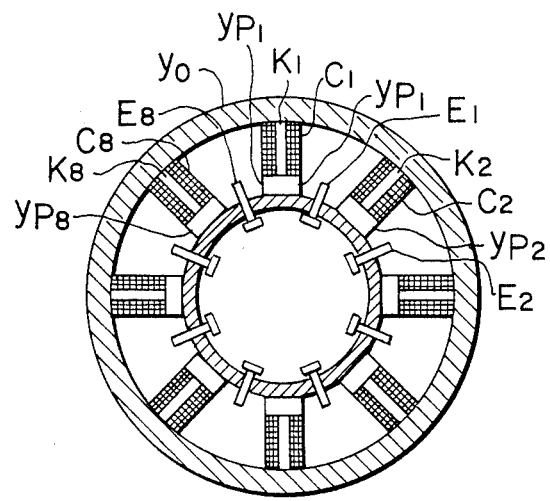

In an embodiment of FIG. 5, the number of magnetic poles, cores, coils, etc., is made twice the number in the case of FIG. 4, that is, eight, and the magnetic poles $Y_{p1}$-$Y_{p8}$, cores $K_1$-$K_8$, coils $C_1$-$C_8$, and electrodes $E_1$-$E_8$ are shown. In this embodiment, a magnetic reluctance of the magnetic gap formed in the flow path is made further smaller than that in the case of FIG. 4, and thus, the efficiency of the magnetic circuit can be improved accordingly.

Figure 6:
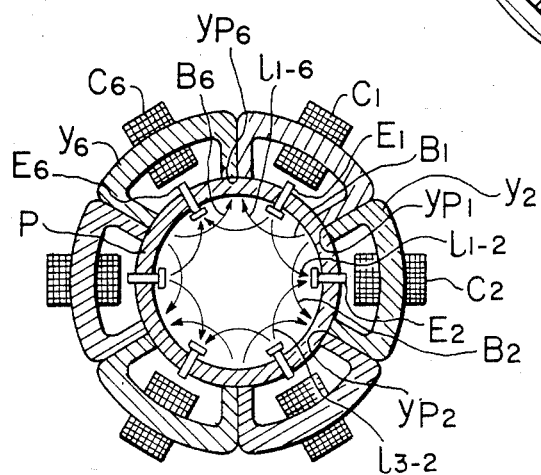

An embodiment of FIG. 6 is the example in which the number of magnetic poles is six, and C-shaped yokes $Y_1$-$Y_6$ respectively wound with coils $C_1$-$C_6$ are arranged on the periphery of a pipe P by equally dividing the circumference of the pipe P.

End portions of the yokes $Y_1$-$Y_6$ serve as the magnetic poles. In this embodiment, the yokes are excited so that abutting end portions of adjacent yokes function as a single unitary magnetic pole. And the excitation is such that in one C-shaped yoke, both ends respectively exhibit opposite polarities.

When the yoke $Y_1$ is excited by the coil $C_1$, magnetic flux B shown by an arrow is caused, and similarly, the yoke $Y_2$ excited by the coil $C_2$ produces magnetic flux $B_2$.

A signal voltage $e_{1-2}$ produced by these magnetic fluxes is detected by electrodes $E_1$ and $E_2$. Other yokes, coils, and electrodes function similarly.

An end of the yoke Y and one end of the yoke $Y_2$ abut against each other, and form a magnetic pole $Y_{p1}$. Similarly, abutting end portions of the yokes $Y_2$ and $Y_3$ form a magnetic pole $Y_{p2}$. A part or the whole of the yoke may be made of a semi-hard magnetic material.

Figure 7:
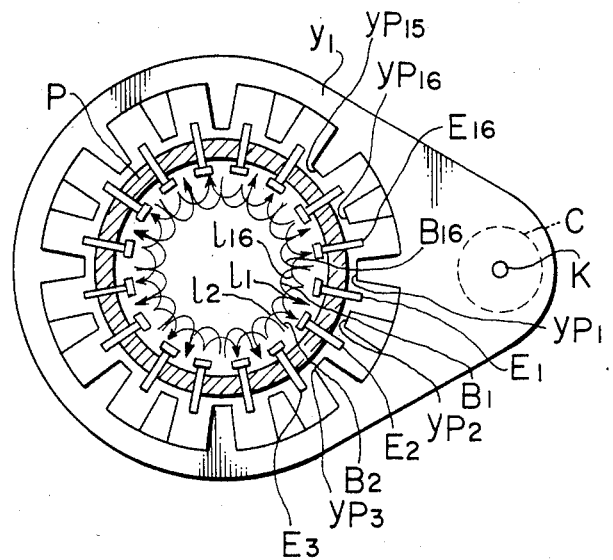
Figure 8:
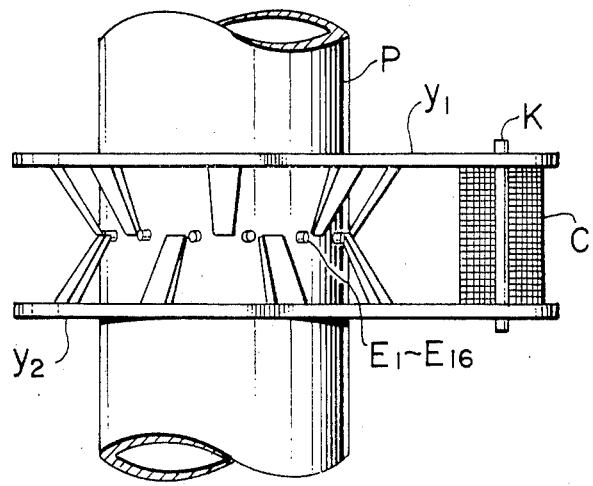

In an embodiment of FIGS. 7 and 8, magnetic poles include sixteen (16) poles, and two sheets of yokes $Y_1$ and $Y_2$ each surrounding a pipe P are disposed along a direction of flow with a small interval therebetween, and a core K is inserted through holes bored in the yokes $Y_1$ and $Y_2$ at positions a small distance spaced from the pipe P. A coil C is wound about the core K so that the coil C extends over the whole interval between the two yokes $Y_1$, $Y_2$. Each of the yokes $Y_1$, $Y_2$ is provided with eight magnetic poles close to the periphery of the pipe P by equally dividing the circumference of the pipe. And each of the magnetic poles of the yoke $Y_1$ and each of the magnetic poles of the yoke $Y_2$ are arranged alternately along the circumference of the pipe P, and electrodes $E_1$-$E_{16}$ are provided at intermediate points between adjacent ones of the 16 magnetic poles. The magnetic poles $Y_{p1}$, $Y_{p3}$, $Y_{p5}$, ... $Y_{p15}$ are formed by bending the yoke $Y_1$, and the magnetic poles $Y_{p1}$, $Y_{p4}$, $Y_{p6}$, ... $Y_{p16}$ are formed by bending the yoke $Y_2$.

In this embodiment, the eight magnetic poles $Y_{p1}$-$Y_{p15}$ of the yoke Y and the eight magnetic poles $Y_{p2}$-$Y_{p16}$ of the yoke Y are excited by one set of the core K and the coil C. And when a current flows through the coil C, magnetic fluxes $B_1$-$B_{16}$ are produced between each magnetic pole of the yoke $Y_1$ and each magnetic pole of the yoke $Y_2$, and signal voltages $e1$-$e16$ corresponding to a velocity of flow are obtained. These signal voltages are detected by 16 electrodes $E_1$-$E_{16}$ provided on the pipe P. These electrodes $E_1$-$E_{16}$ are provided on the pipe P at intermediate points between adjacent ones of the 16 magnetic poles $Y_{p1}$, $Y_{p2}$, ... $Y_{p16}$ of both the yokes $Y_1$ and $Y_2$ so that one end of each electrode protrudes into the inside of the pipe P.

In this respect, as described previously, the magnetic poles $Y_{p2}$, $Y_{p4}$, ... $Y_{p16}$ of the yoke $Y_2$ are formed by bending the yoke $Y_2$ towards the yoke $Y_1$, and the magnetic poles $Y_{p1}$, $Y_{p3}$, ... $Y_{p15}$ of the yoke $Y_1$ are formed by bending the yoke Y towards the yoke $Y_2$. The core K may be made of a soft or a semi-hard magnetic material.

Figure 9:
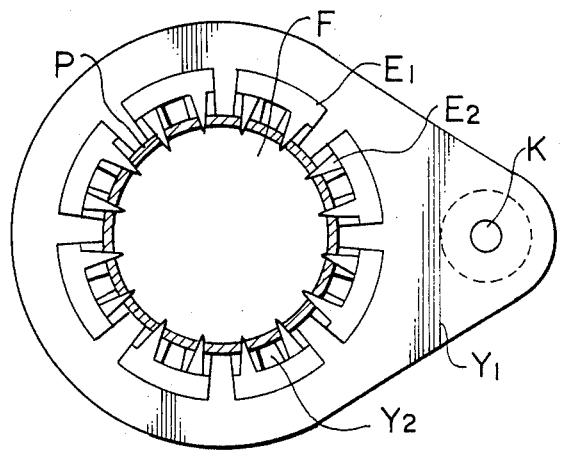
Figure 10:
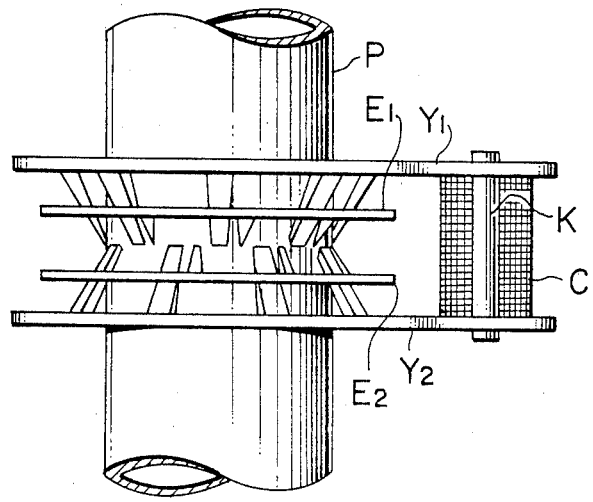

An embodiment of FIGS. 9 and 10 differs from the embodiment of FIGS. 7 and 8 only in the structure of electrodes. Accordingly, this difference will be described primarily. FIG. 9 shows a section at right angles to the pipe P, and each of electrodes $E_1$ and $E_2$ made of a non-magnetic conductor is of a ring shape as a whole and has 8 protrudings protruding towards the center of the ring. The protrudings are embeded in the pipe P so that the tip ends thereof are in contact with a fluid F.

The protrudings of both the electrodes $E_1$, $E_2$ are arranged alternately in a circumferential direction of the circular fluid path. The electrodes $E_1$, $E_2$ are formed by punching a plate of SUS 316 and bending the punched plate. Yokes $Y_1$, $Y_2$ are formed by working a plate of SUS 430 in a similar manner. After assembling the electrodes $E_1$, $E_2$ and the yokes $Y_1$, $Y_2$ integrally, the assembly is cast with epoxy resin or the like to fix each member at a predetermined position, and at the same time, cured epoxy resin forms the pipe P. Lastly, the coil C and the core K are attached to the yokes $Y_1$ and $Y_2$ and the assembling is completed.

In the electromagnetic flowmeter structured as described above, the magnetic reluctance between magnetic poles is decreased, and since the efficiency of the magnetic circuit is improved, the electromagnetic flowmeter of small power consumption can be realized.

Further, the electromagntic flowmeter having small pressure loss can be realized with low power consumption, since there is no disturber in the flow path.

I claim:

1. An electromagnetic flowmeter comprising:
   a cylindrical flow path;
   an even number of magnetic poles disposed on the periphery of said cylindrical flow path by equally dividing the circumference thereof, adjacent magnetic poles of said even number of magnetic poles having opposite polarities; and
   a plurality of electrodes positioned at intermediate points between respective adjacent magnetic poles, said plurality of electrodes have one ends being in contact with a fluid in said cylindrical flow path,
   wherein said even number of magnetic poles are corresponding in number to said electrodes, and said number is equal to four or larger.

2. An electromagnetic flowmeter according to claim 1 wherein said plurality of electrodes are formed by two sheets of plates of non-magnetic electrical conductors having a ring shape as a whole, each of said two plates has a plurality of protrudings protruding towards the center of the ring, and said protrudings of said two plates are arranged alternately in a direction of the circumference of said cylindrical flow path to form a contact surface with the fluid.

3. An electromagnetic flowmeter according to claim 2 wherein said even number of magnetic poles are formed in two sheets of yokes, and each of said yokes is made of a soft magnetic material.

4. An electromagnetic flowmeter according to claim 2 wherein said even number of magnetic poles are formed in two sheets of yokes, and a part or the whole of each of said yokes is made of a semi-hard magnetic material.

5. An electromagnetic flowmeter according to claim 1 wherein said even number of magnetic poles are formed by end portions of a predetermined number of C-shaped yokes each having a coil wound thereabout.

6. An electromagnetic flowmeter comprising:
   a cylindrical flow path;
   an even number of magnetic poles disposed on the periphery of said cylindrical path by equally dividing the circumference thereof;
   a plurality of cores having one ends respectively being in contact with said even number of magnetic poles and extending outwardly radially with respect to said flow path;
   a plurality of coils respectively wound about said cores for exciting said cores so that adjacent cores exhibit opposite polarities to each other;
   an outer yoke having a ring shape for connecting the other ends of said cores to form a magnetic circuit; and
   a plurality of electrodes disposed respectively at intermediate points of respective adjacent magnetic poles and having one ends being in contact with a fluid in said cylindrical fluid path,
   wherein said even number of magnetic poles are corresponding in number to said cores, to said coils, and to said electrodes, and said number is equal to four or larger.

7. An electromagnetic flowmeter according to claim 6 wherein said yoke and said cores are made of a soft magnetic material.

8. An electromagnetic flowmeter according to claim 6 wherein said cores are made of a semi-hard magnetic material.

9. An electromagnetic flowmeter comprising:
   a cylindrical flow path;
   two sheets of yokes provided on the periphery of said cylindrical flow path in a direction of flow in said flow path, said yokes being opposed to and spaced from each other by a small distance;
   a plurality of protruding magnetic poles formed in each of said two sheets of yokes and protruding towards the periphery of said cylindrical flow path;
   a core interposed between said two sheets of yokes spaced from said cylindrical flow path; and
   a coil wound about said core,
   wherein each of said plurality of protruding magnetic poles of one of said two yokes and each of said plurality of protruding magnetic poles of the other of said two yokes are arranged alternately along the periphery of said cylindrical flow path, and
   a plurality of electrodes are disposed respectively at intermediate points between respective adjacent magnetic poles of said two sheets of yokes.

10. An electromagnetic flowmeter according to claim 9 wherein said two sheets of yokes and said core are made of a soft magnetic material.

11. An electromagnetic flowmeter according to claim 9 wherein said core is made of a semi-hard magnetic material.

* * * * *